United States Patent Office 3,709,963
Patented Jan. 9, 1973

3,709,963
PROCESS FOR PRODUCING DENSE PARTICLES OF PLUTONIUM COMPOUNDS USABLE AS FUELS FOR NUCLEAR REACTORS
Guido Cogliati, Agostino Recrosio, and Renato Lanz, Rome, Italy, assignors to Comitato Nazionale per l'Energia Nucleare, Rome, Italy
No Drawing. Filed Oct. 4, 1968, Ser. No. 765,024
Claims priority, application Italy, Oct. 13, 1967, 40,045/67
Int. Cl. G21c 21/00
U.S. Cl. 264—.5
12 Claims

ABSTRACT OF THE DISCLOSURE

Dense particles of a compound of plutonium or a mixed compound of plutonium and another metal of the lanthanide or actinide series are produced by a process wherein an acid solution of plutonium (IV) is transformed into a colloidal acid-deficient solution through extraction of nitric acid by means of a liquid anion exchanger until a nitrate-to-plutonium ratio in the range of from 1 to 1.5 is produced and through evaporation of water, if necessary, until a concentration of plutonium in the range of 1 to 2 moles per liter is produced. The colloidal solution of plutonium (IV) may be mixed, if desired, with a suitable colloidal solution of another metal of the actinide or lanthanide series and/or carbon powder. The resulting colloidal solution is dispersed as drops which are transformed into gel particles calcined at suitable temperatures.

---

The object of this invention is, in general, the production of compounds of plutonium or mixed compounds of plutonium and other metals in the form of particles suitable for being used as fuel in nuclear reactors.

The methods so far proposed for producing such particles may be subdivided into two categories: the metallurgical methods and the hydrometallurgical methods. The former ones are based upon the agglomeration of powders and the thermal treatments of such agglomerates; this involves the use of complicated mechanical treatments and of very high sintering temperatures. The latter ones make use of colloidal solutions of the metals involved which solutions have extremely low anion-to-metal ratio; or are based on the hydrolysis of the metals concerned and on the subsequent production of a precipitate in the form of particles which are made to cohere by an organic binder.

A novel hydrometallurgical method has been disclosed by the U.S. Pat. No. 3,401,122; through the method therein described the use of colloidal solutions with a very low anion-to-metal ratio is avoided which are difficult and laborious to prepare especially in the case of plutonium; the use of organic binders being also avoided whereby the thermal treatments are simplified and final products are obtained with an extremely high density.

That method however does not provide for preparing a colloidal solution of Pu (IV) and consequently, the preparation of dense particles of compounds of plutonium alone is not provided thereby; according to said patent the product obtained always comprises dense particles of mixed compounds of plutonium and other metals and the related production process always involves the step of preparing a colloidal solution of mixed compounds of plutonium and other metals.

A method has now been found which is the object of this invention for preparing colloidal solutions of compounds of Pu (IV) only and therefore for preparing dense particles of compounds of plutonium only and further a method for preparing dense particles of mixed compounds of plutonium which is more advantageous than those so far disclosed.

The method of this invention for preparing dense particles of compounds of plutonium whether alone or mixed with other metals is simple and inexpensive; it does not require any complicated mechanical process; it does not involve the recycling of high percentages of the process material; lower temperatures are required than with the metallurgical methods; colloidal solutions with a low anion-to-metal ratio and of organic binders are not required; it may be readily applied to automatized and remotely operated plants.

The process of this invention comprises the following steps: preparing a colloidal solution of plutonium (IV) starting from an acid solution of plutonium (IV); mixing said colloidal solution of plutonium (IV) with a colloidal solution of another metal if so desired; subdividing the colloidal solution so obtained into particles having the desired shape and size; consolidating the particles of colloidal solution through a pH rise; drying and calcining the particles so consolidated.

It is known that dense particles of fertile and/or fissile elements are used in many types of fuel elements for nuclear reactors; for instance in those elements which consist of vibro-compacted powders of suitable grain size or in those elements wherein the fuel particles (whether coated or not with substances capable of preventing the release of the fissing products) are dispersed in suitable matrices for instance of graphite.

According to the method herein proposed, a solution of a plutonium (IV) salt (chloride, nitrate etc.) containing any concentration of free acid and of plutonium is brought in contact with an anionic exchanger in such a way that the ratio anion-to-plutonium is lowered from the starting value down to a value ranging from 1 to 1.5. The colloidal solution so obtained is then, if so required, evaporated until a concentration of 1–1.5 M/l. of plutonium is attained. When particles of mixed compounds of plutonium and other metals are to be prepared, the colloidal solution of plutonium is mixed with the corresponding colloidal solution of the desired metals (for instance: uranium (IV), thorium, cerium, americium, curium, europium, zirconium, beryllium, etc.). The colloidal solution is then dispersed (for instance by spraying or by stirring) in an organic solvent not miscible with water which solvent contains a suitable amount of anion exchanger. The purpose of such anion exchanger is for extracting the most of the anionic groups from the colloidal solution and thereby bringing about the gelling of the particles. Through the production of a gel (not of a precipitate) coherent particles are formed which do not require the addition of organic binders. Because the gelling is produced by extraction of acid, such colloidal solutions may be used with an anion concentration which is relatively high (the ratio anions-to metal may be about 1–1.5). If the gelling were effected by another way (for instance, through dehydration) the anions still present in the gel particles could bring about the breakage of the particles during the drying and calcining cycles. The gel particles so obtained are then dried and calcined in a controlled atmosphere.

Carbon powder must be added to the colloidal solution whenever certain plutonium compounds are to be prepared; for instance the compounds of plutonium with carbon, or with nitrogen, or sulphur, phosphor, arsenic, selenium, etc.

The thermal cycle also and the atmosphere wherein the calcination of the particles is carried out is changed to fit the particular plutonium compound involved; for instance the thermal treatment may be carried out in an atmosphere of hydrogen, of nitrogen of hydrogen sulphide etc.

The present invention is illustrated by three not limitative examples thereof.

EXAMPLE 1

1 liter of a solution of plutonium (IV) nitrate containing 0.2 M of plutonium and 0.5 M of free nitric acid is put in a separator funnel and shaken together with 850 ml. of a solution at 50% by volume of Primene JMT in Shellsol T. After decanting, two phases are separated: an organic phase with a concentration of 2 mg./l. plutonium and an aqueous solution wherein the ratio nitrates-to-plutonium is about 1.3. The aqueous phase is evaporated at 80° C. until a concentration of 1.2 M/l. of plutonium is attained. The plutonium solution so obtained is dispersed in as drops of the desired diameter in 10 liters of Alphanol 79 containing 2% by volume of Primene JMT. The solution drops are maintained in suspension and become consolidated within 15 minutes; they are then filtered, washed with 500 ml. carbon tetrafluoride and subsequently calcined at 1150° C. in air for two hours. The particles so obtained have a diameter ranging from a few microns up to 1000 microns and a density higher than the 98% of the theoretical density of the plutonium oxide.

In this example and the following examples the term "Primene JMT" is a trade name for a mixture of long chain aliphatic primary amines a representative formula being $C_{18}H_{37}NH_2$. The term "Alphanol 79" is a trade name for a mixture of normal aliphatic alcohols with a number of carbon atoms which may vary from 7 to 9. The term "Shellsol T" is a trade name for a mixture of aliphatic hydrocarbons; it is a petroleum fraction with a boiling point of about 220° C.

EXAMPLE 2

41.6 ml. of the plutonium solution with a ratio of $$NO_3^-/Pu(IV)=1.3$$

prepared as per Example 1 are mixed with 100 ml. of a colloidal solution of uranium (IV) prepared as per U.S. Pat. No. 3,401,122 that is through catalytic reduction with hydrogen of a 2.5 M solution of uranyl nitrate with a ratio $NO_3^-/U(IV)=1.5$. The resulting solution is stable in time and is dispersed as drops of the desired diameter in 10 liters Alphanol 79 containing 2% by volume of Primene JMT. The drops of uranium-plutonium solution are kept in suspension and become consolidated within 15 minutes, they are then filtered, washed with 520 ml. of carbon tetrafluoride and eventually calcined at 1150° C. for two hours in an atmosphere of argon-hydrogen at 5% by volume.

The particles so obtained comprise a mixed oxide uranium-plutonium (20% atom percentage), their diameters range from a few microns up to 1000 microns and the density is higher than the 98% of the theoretical density of the corresponding uranium-plutonium oxide.

EXAMPLE 3

150 g. of carbon powder incorporated by milling in a ball mill with 100 ml. of a colloidal solution of thorium having a ratio $NO_3^-/Th=0.4$ and containing 2.5 M/l. of thorium. To such mixture, 41.6 ml. of a plutonium solution are then added which solution has been prepared as per Example 1.

The resulting product is then dispersed as drops of the desired diameter in 10 liters of Alphanol 79 containing 2% by volume of Primene JMT. The drops of thorium-plutonium solution with their carbon content are kept in suspension and become consolidated within 15 minutes; they are then filtered and washed with 500 ml. of carbon tetrachloride. The subsequent thermal treatment is carried out in a furnace equipped with graphite resistors under a vacuum ($10^{-5}$ mm. Hg) and at a temperature of 1750° C. The so obtained particles are made of thorium-plutonium dicarbide with 20% atom percentage of plutonium.

Having now particularly described and ascertained our said invention and in what manner the same is to be performed, we declare that what we claim is:

1. A process for producing dense particles of a compound of plutonium or of a mixed compound of plutonium and of another metal of the lanthanide or actinide series, which comprises transforming an acid solution of plutonium (IV) into a colloidal acid deficient solution through extraction of nitric acid by means of an anion liquid exchanger until a nitrates-to-plutonium ratio is attained in the range from 1 to 1.5 and through evaporation of water, until a concentration of plutonium in the range from 1 to 2 moles per liter is attained; mixing the colloidal solution of plutonium (IV) with no other substance when a plutonium oxide is to be obtained as final product; with carbon powder when a plutonium compound, other than oxide, is to be obtained; with a colloidal solution of said another metal of the actinide or lanthanide series when a mixed oxide of plutonium and said another metal is to be obtained as final product; with carbon and with a colloidal solution of said another metal when a mixed compound, other than an oxide, of plutonium and of said another metal is to be obtained as final product; transforming the resulting colloidal solution into gel particles by dispersing it as drops in a solvent not miscible with water in which solvent a liquid anion exchanger is contained; calcining said particles to obtain dense particles.

2. A process for producing dense particles of plutonium oxide as per claim 1 wherein the colloidal solution of plutonium (IV) is not mixed with other substances and the gel particles are calcined in air at temperatures higher than 600° C.

3. A process for producing dense particles of uranium-plutonium mixed oxide at any uranium-to-plutonium ratio, as per claim 1, in which process the colloidal solution of plutonium (IV) is mixed with a colloidal solution of uranium (IV) containing from 1 to 3 moles/liter of uranium, with a ratio nitrate/uranium in the range from 1 to 1.5; in which process the gel particles are calcined in an argon-hydrogen atmosphere at temperatures higher than 600° C.

4. A process for producing dense particles of plutonium-thorium mixed oxide at any thorium/plutonium ratio as per claim 1, in which process the colloidal solution of plutonium (IV) is mixed with a colloidal solution of thorium containing from 1 to 4 moles/liter with a ratio anion/thorium in the range from 0.1 to 1; in which process the gel particles are calcined in air at temperatures above 600° C.

5. A process for producing dense particles of mixed oxides of plutonium and metals of the actinide or lanthanide groups as per claim 1, in which process the colloidal solution of plutonium (IV) is mixed with a colloidal solution of the actinide and lanthanide metals containing from 1 to 4 moles/liter of the same metals, with a ratio nitrates/metals in the range from 0.1 and 1.0; in which process the gel particles are calcined in air at temperatures above 600° C.

6. A process for producing plutonium carbide particles as per claim 1, in which process the colloidal solution of plutonium (IV) is mixed with carbon thin powder; in which process the gel particles are calcined under vacuum or in a stream of a rare gas at temperatures above 1000° C.

7. A process for producing particles of plutonium-uranium mixed carbides as per claim 1, in which process the colloidal solution of plutonium (IV) is mixed with a colloidal solution of uranium (IV) containing from 1 to 3 moles/liter with a ratio nitrates/uranium in the range from 1 to 1.5 and with carbon thin powder; in which process the gel particles are calcined under vacuum or in a stream of a rare gas at temperatures above 1000° C.

8. A process for producing particles of mixed carbides of plutonium and actinide and lanthanide metals as per claim 1 in which process the colloidal solution of plutonium (IV) is mixed with a colloidal solution of the lanthanide and actinide metals containing from 1 to 4 moles of the metals per liter with a ratio anion to metal in the range from 0.1 to 1.0 and with carbon thin powder; in which process the gel particles are calcined under vacuum or in a stream of a rare gas at temperatures above 1000° C.

9. A process for producing dense particles of plutonium nitrides or sulphides as per claim 1, in which process the colloidal solution of plutonium (IV) is mixed with carbon thin powder in which process the gel particles are calcined in an atmosphere of nitrogen or of hydrogen sulphides or of hydrogen phosphide at temperatures above 1000° C.

10. A process for producing dense particles of mixed nitrides or sulphides or phosphides of plutonium and uranium as per claim 1, in which process the colloidal solution of plutonium (IV) is mixed with a colloidal solution of uranium (IV) containing from 1 to 3 moles of uranium per liter of which solution the ratio nitrate/uranium ranges from 1 to 1.5 and with carbon thin powder; in which process the gel particles are calcined in an atmosphere of nitrogen or of hydrogen sulphide or of hydrogen phosphide at temperatures above 1000° C.

11. A process for producing dense particles of mixed nitrides or sulphides or phosphides of plutonium and lanthanide and/or actinide metals as per claim 1, in which process the colloidal solution of plutonium (IV) is mixed with a colloidal solution of the actinide and/or lanthanide metals containing from 1 to 4 moles of the metals per liter with a ratio anion/metals in the range from 0.1 to 1.0 and with carbon thin powder; in which process the gel particles are calcined in an atmosphere of nitrogen or of hydrogen sulphide, or of hydrogen phosphide at temperatures above 1000° C.

12. A process according to claim 1 wherein the liquid anion exchanger employed for extracting nitric acid both from the plutonium (IV) acid solution and from the drops of colloidal solution is a primary aliphatic amine.

References Cited
UNITED STATES PATENTS

| | | | |
|---|---|---|---|
| 3,310,386 | 3/1967 | Lloyd | 23—344 |
| 3,320,179 | 5/1967 | Gens | 23—344 X |
| 3,345,437 | 10/1967 | Flack et al. | 23—344 X |
| 3,384,687 | 5/1968 | Flack et al. | 23—344 X |
| 3,397,257 | 8/1968 | Brambilla et al. | 264—.5 |
| 3,401,122 | 9/1968 | Cogliati et al. | 23—344 X |
| 3,438,749 | 4/1969 | Lonadier et al. | 264—.5 X |

BENJAMIN R. PADGETT, Primary Examiner

S. J. LECHERT, Jr., Assistant Examiner

U.S. Cl. X.R.

23—344; 252—301.1